United States Patent
Ju et al.

(10) Patent No.: US 10,540,552 B2
(45) Date of Patent: Jan. 21, 2020

(54) DEVICE AND METHOD SURVEILLING ABNORMAL BEHAVIOR USING 3D IMAGE INFORMATION

(71) Applicant: S-1 CORPORATION, Seoul (KR)

(72) Inventors: Jinsun Ju, Seoul (KR); Dong Sung Lee, Seongnam (KR)

(73) Assignee: S-1 CORPORATION, Seoul (KR)

( * ) Notice: Subject to any disclaimer, the term of this patent is extended or adjusted under 35 U.S.C. 154(b) by 319 days.

(21) Appl. No.: 15/326,780

(22) PCT Filed: Oct. 23, 2014

(86) PCT No.: PCT/KR2014/010023
§ 371 (c)(1),
(2) Date: Jan. 17, 2017

(87) PCT Pub. No.: WO2016/013719
PCT Pub. Date: Jan. 28, 2016

(65) Prior Publication Data
US 2017/0206423 A1    Jul. 20, 2017

(30) Foreign Application Priority Data

Jul. 22, 2014    (KR) .................. 10-2014-0092765

(51) Int. Cl.
*G06K 9/00* (2006.01)
*G06T 7/194* (2017.01)
(Continued)

(52) U.S. Cl.
CPC ....... *G06K 9/00771* (2013.01); *G06K 9/4604* (2013.01); *G06K 9/6202* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2008/0074256 A1* | 3/2008 | Hirai | G08B 13/196 340/541 |
| 2009/0214081 A1* | 8/2009 | Nakano | G06K 9/00785 382/103 |
| 2013/0084006 A1* | 4/2013 | Zhang | G06T 7/194 382/173 |

FOREIGN PATENT DOCUMENTS

| | | |
|---|---|---|
| KR | 10-2001-0016639 | 3/2001 |
| KR | 10-0665957 | 1/2007 |

(Continued)

OTHER PUBLICATIONS

Search Report & Written Opinion, Patent Cooperation Treaty, Application No. PCT/KR2014/010023, dated Apr. 20, 2015.

*Primary Examiner* — Alexander Gee
(74) *Attorney, Agent, or Firm* — Lex IP Meister, PLLC

(57) ABSTRACT

Disclosed herein are a method and a device for surveilling an abnormal behavior using 3D image information. The surveilling device converts depth information, which is the 3D image information, into a real world coordinate and uses the real world coordinate to calculate a plane reference distance value. The surveilling device uses the plane reference distance value to generate a background model and compares the background model with the plane reference distance value of a current image to detect a region of interest. Further, the surveilling device extracts the 3D feature information of the region of interest to determine an abnormal behavior of an object.

17 Claims, 8 Drawing Sheets

(51) Int. Cl.
*G06T 7/11* (2017.01)
*G06T 7/73* (2017.01)
*G06T 7/246* (2017.01)
*G06K 9/46* (2006.01)
*G06K 9/62* (2006.01)
*G06K 9/66* (2006.01)
*H04N 7/18* (2006.01)
*H04N 13/204* (2018.01)
*G06T 7/254* (2017.01)
*H04N 13/00* (2018.01)
*H04N 13/20* (2018.01)

(52) U.S. Cl.
CPC ................ *G06K 9/66* (2013.01); *G06T 7/11* (2017.01); *G06T 7/194* (2017.01); *G06T 7/248* (2017.01); *G06T 7/73* (2017.01); *H04N 7/183* (2013.01); *H04N 13/204* (2018.05); *G06T 2207/10012* (2013.01); *G06T 2207/30232* (2013.01)

(56) References Cited

FOREIGN PATENT DOCUMENTS

| | | |
|---|---|---|
| KR | 10-2009-0081968 | 7/2009 |
| KR | 10-2011-0001172 | 1/2011 |
| KR | 10-2011-0030173 | 3/2011 |
| KR | 10-2012-0025718 | 3/2012 |
| KR | 10-2012-0104711 | 9/2012 |
| KR | 10-2012-0113014 | 10/2012 |
| KR | 10-2012-0114629 | 10/2012 |
| KR | 10-2013-0094488 | 8/2013 |
| KR | 10-2014-0036824 | 3/2014 |
| KR | 10-1454548 | 10/2014 |

* cited by examiner (a)  410

(b)

DEVICE AND METHOD SURVEILLING ABNORMAL BEHAVIOR USING 3D IMAGE INFORMATION

TECHNICAL FIELD

The present invention relates to a device and a method for surveilling an abnormal behavior using a 3D image information.

BACKGROUND ART

A CCTV system which is an image surveilling device has been applied to various fields. In the existing CCTV as the surveilling device, a person directly confirms most of photographed contents using an analog video recorder (AVR), a digital video recorder (DVR), and a network video recorder (NVR) to determine abnormal behaviors. Therefore, the existing surveilling device requires many operating personnel to directly determine an abnormal behavior and it is easy for the operating personnel to miss objects or behaviors to be identified. Therefore, there is a need to develop an intelligent surveilling device that may automatically monitor a specific object or a human behavior without a person surveilling an image for 24 hours and then notifies a user of the surveilled result and may quickly cope with abnormal behaviors.

As a method for detecting a person using 2D image information, there are a method for using an image difference between two frames, a method for creating static/dynamic background models, a method for using learning, or the like.

The method for using an image difference between two frames is a method for calculating a difference between pixel values of corresponding coordinates in a previous frame and a current frame. When a moving object is present between the two frames, the principle that the difference between the pixel values has a value other than 0 has been used.

The method for creating a background model is divided into a static background modeling method and a dynamic background modeling method. The static background modeling method is a method for accumulating a pixel value of an image without intrusion of a person/object for a predetermined time after a camera is driven to calculate an average value to thereby create a background model and obtaining a difference between the background model and a current incoming image. However, the static background modeling method generates a region in which the object/person is absorbed into the background model when the object/person is entered while the background model is created and thus is not detected.

The dynamic background modeling method updates the background model at a predetermined time interval to improve the static background modeling method. However, the dynamic background modeling method has a drawback in that when the person/object is intruded and thus stays at the same location without moving, the intruded person/object is absorbed into the background.

Meanwhile, the method for using learning is a method for manually generating data about a person's shape in advance, learning the generated data in adaptive boosting (AdaBoost), a neural network, a support vector machine (SVM), or the like, and searching whether objects similar to data learned in a current image are present. The method has a drawback in that a large amount of learning data needs to be manually collected in advance and person detection performance relies on the collected learning data.

The existing methods as described above detect a person and calculate a size, a motion, or the like of a person/object on the basis of the detected pixel information to detect abnormal behaviors. The method for using a 2D image detects a person using only color information and extracts features and therefore sensitively reacts to a change in surrounding environment like a change in illumination, covering the image with a shadow or a thing, or the like to increase an incorrect reporting rate.

DISCLOSURE

Technical Problem

The present invention has been made in an effort to provide a method and a device for surveilling an abnormal behavior using a 3D image information capable of improving an abnormal detection rate.

Technical Solution

An exemplary embodiment of the present invention provides a method for surveilling, by a surveilling device, an object using an image input through a 3D camera. The method for surveilling includes: converting the image into a real world coordinate that is a spatial coordinate; detecting a floor plane and calculating a plane reference distance value representing a distance far away from the floor plane, using the real world coordinate; generating a background model, which is a background portion of the image, on the basis of the plane reference distance value for a predetermined time; comparing a first plane reference distance value, which is the plane reference distance value calculated in the calculating of the image input after the predetermined time, with the background model to detect a region of interest.

The method may further include: performing labeling on the region of interest using the real world coordinate of the region of interest.

The method may further include: tracking the labeled region of interest using central point information on the labeled region of interest.

The method may further include: determining whether there is an abnormal behavior of the object using the real world coordinate of the region of interest.

The calculating of the floor plane may include: setting three points located on the floor plane using one point where a Y-axis value is a minimum value on the real world coordinate and calculating a plane equation using the three points.

The calculating of the plane reference distance value may include calculating the plane reference distance value using the plane equation.

The generating may include: calculating an average value by accumulating the plane reference distance value for a predetermined time; and setting the average value as the background model.

The method may further include: comparing the first plane reference distance value with the background model to determine a background portion and a foreground portion in the image; and updating the background model using a region determined as the background portion.

The detecting of the region of interest may include comparing the first plane reference distance value with the updated background model to detect the region of interest.

The determining of the background portion and the foreground portion may include obtaining a difference value between the first plane reference distance value and the background model; determining the foreground portion in the image if the difference value exceeds a predetermined threshold value; and determining the background portion in the image if the difference value is equal to or less than the predetermined threshold value, and the predetermined threshold value may be differently set depending on a distance value from the floor plane.

The determining whether there is an abnormal behavior of the object may include: extracting a 3D feature including at least one of a height, a width, a thickness, and a moving speed of the object using the real world coordinate of the region of interest; and determining whether there is an abnormal behavior of the object using the 3D feature.

The abnormal behavior of the object may be at least one behavior of intrusion, wandering, crowding, falling, and running of the object.

Another embodiment of the present invention provides a surveilling device. The surveilling device includes: a coordinate converter converting a depth image input through a 3D camera into a real world coordinate that is a space coordinate; a floor region detector detecting a floor plane and calculating a plane reference distance value representing a distance far away from the floor plane, using the real world coordinate; a background model generator generating a background model, which is a background portion of a depth image, on the basis of the plane reference distance value for a first time; and a region of interest detector comparing a first plane reference distance value that is a plane reference distance value calculated by the floor region detector with the background model, for the depth image input after the first time to detect a region of interest.

The region of interest detector may perform a label for the region of interest using the real world coordinate of the region of interest and the surveilling device may further include a region of interest tracker tracking the labeled region of interest using central point information on the labeled region of interest.

The surveilling device may further include: a region of interest calculator extracting a 3D feature for an object using the real time coordinate of the region of interest; and an abnormal behavior determiner determining whether there is an abnormal behavior of the object using the 3D feature.

The background model generator may accumulate the plane reference distance value for the first time to calculate an average value and set the average value as the background model.

The surveilling device may further include: a background determiner comparing the first plane reference distance value with the background model to determine the background portion in the image and using the background portion to update the background model.

Yet another exemplary embodiment of the present invention provides a surveilling system. The surveilling system includes: a 3D camera installed in a region to be monitored and acquiring an image of the region; and a surveilling device converting a depth image acquired from the 3D camera into a real world coordinate that is a space coordinate, using the real time coordinate to detect a floor plane of the depth image, calculating a plane reference distance value representing a distance far away from the floor plane, and generating a background model, which is a background portion of the depth image, on the basis of the plane reference distance value calculated for a predetermined time.

The surveilling device may calculate a first value that is a value obtained by calculating the plane reference distance value for the depth image incoming after the predetermined time and compare the first value with the background model to detect a region of interest.

The surveilling device may use the real world coordinate of the region of interest to perform a label on the region of interest, use the real world coordinate of the region of interest to extract a 3D feature for the object, and use the 3D feature to determine an abnormal behavior of the object.

Advantageous Effects

According to an exemplary embodiment of the present invention, it is possible to improve the abnormal behavior detection rate by detecting the object and detecting the abnormal behaviors using the 3D image.

According to another exemplary embodiment of the present invention, it is possible to selectively update only the background region in the background model when the background model is generated to prevent the object from being absorbed into the background.

MODE FOR INVENTION

Figure 1:
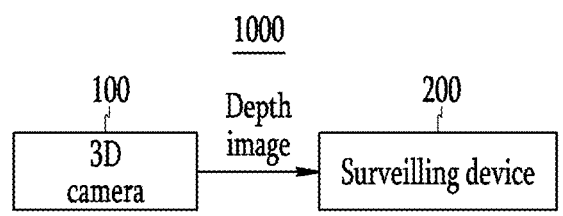
FIG. 1 is a diagram illustrating a surveilling system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Further, throughout the specification, an object may refer to a person, an animal, or an object. However, for convenience of explanation, the following description describes the case in which the object is a person but the scope of the present invention is not limited thereto.

A surveilling device according to an exemplary embodiment of the present invention is a device that uses 3D image information to surveil abnormal behaviors of an object. That is, the surveilling device according to the exemplary embodiment of the present invention detects and tracks the object and automatically detects abnormal behaviors such as an intrusion, wandering, crowding, falling, and running on the basis of information obtained using a 3D camera to efficiently perform image surveillance. The surveilling device and the operation method thereof according to the exemplary embodiment of the present invention will be described below in detail.

FIG. 1 is a diagram illustrating a surveilling system according to an exemplary embodiment of the present invention.

As illustrated in FIG. 1, a surveilling system 1000 according to an exemplary embodiment of the present invention includes a 3D camera 1000 and a surveilling device 200.

The 3D camera 100 is installed in a surveilling region to be monitored and photographs an image of the surveilling region. The 3D camera 100 according to the exemplary embodiment of the present invention acquires a depth image including distance (depth) information. The 3D camera 100 may be implemented as a stereo camera that generates 3D information on the basis of a time of flight (TOF) camera providing the distance (depth) information, a laser range finder (LRF) sensor, Kinect, prime sense, soft Kinetic, or two color images.

The surveilling device 200 uses the depth image transmitted from the 3D camera 100 to detect and track the region of interest including an object and determine abnormal behaviors of the object. Further, when detecting the abnormal behaviors of the object, the surveilling device 200 may transmit an emergency alarm signal to the outside. The detailed configuration and operation of the surveilling device 200 according to the exemplary embodiment of the present invention will be described in detail with reference to FIGS. 2 and 3.

Figure 2:
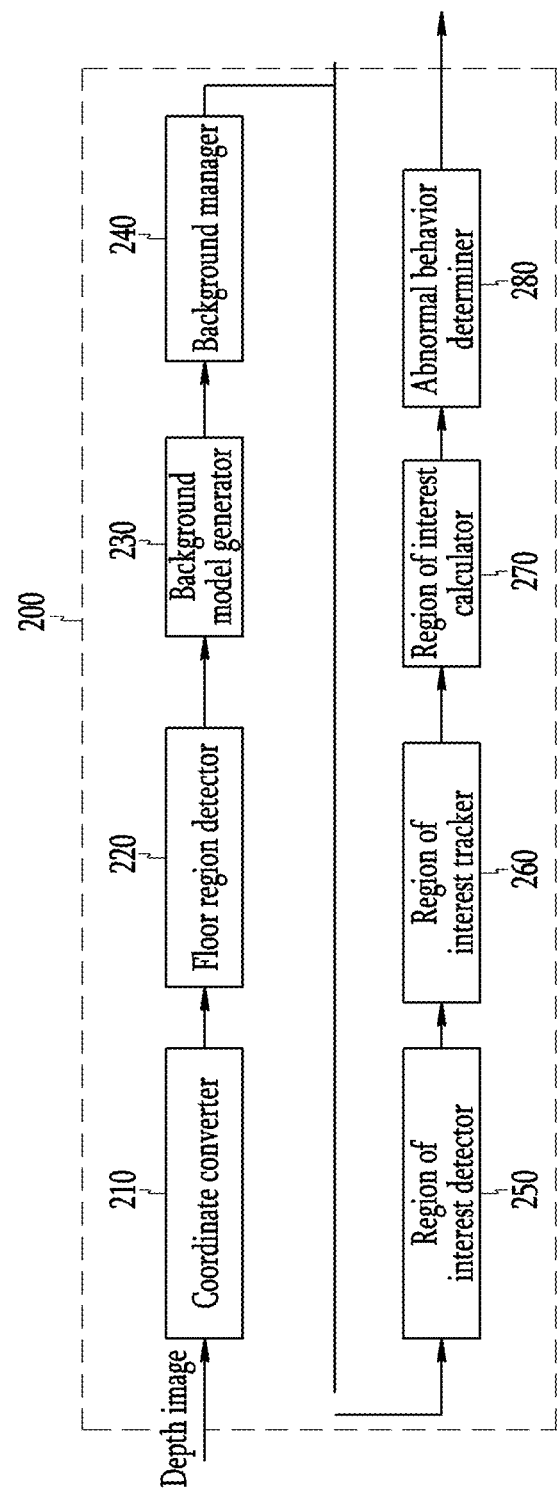
FIG. 2 is a diagram illustrating a configuration of a surveilling device 200 according to an exemplary embodiment of the present invention.
Figure 3:
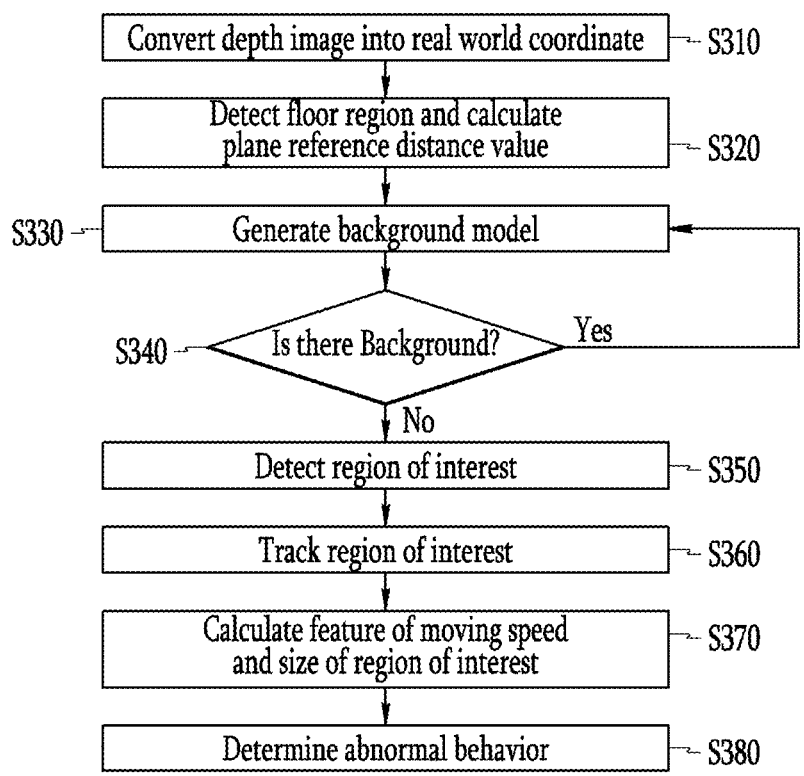
FIG. 3 is a diagram illustrating an operation method of a surveilling device 300 according to an exemplary embodiment of the present invention.

FIG. 2 is a diagram illustrating the configuration of the surveilling device 200 according to the exemplary embodiment of the present invention and FIG. 3 is a diagram illustrating an operation method of a surveilling device 300 according to an exemplary embodiment of the present invention.

As illustrated in FIG. 2, the surveilling device 200 according to the exemplary embodiment of the present invention includes a coordinate converter 210, a floor region detector 220, a background model generator 230, a background determiner 240, a region of interest detector 250, a region of interest tracker 260, a region of interest calculator 270, and an abnormal behavior determiner 280.

The coordinate converter 210 according to the exemplary embodiment of the present invention converts the depth image transmitted from the 3D camera 100 into a real world coordinate (i.e., 3D coordinate) (S310). The 3D camera 100 provides only distance information on a Z axis and therefore the coordinate converter 210 uses the following Equation 1 to convert the depth image into the 3D coordinate.

$$X_{rw} = \left(\frac{X}{imagewidth} - 0.5\right) \times Z_{rw} \times XtoZ \quad \text{(Equation 1)}$$

$$Y_{rw} = \left(0.5 - \frac{Y}{imageheight}\right) \times Z_{rw} \times XtoZ$$

In the above Equation 1, Xrw represents a real world coordinate of an X axis, Yrw represents a real world coordinate of a Y axis, an imagewidth represents an image width, an imageheight represents an image height. X and Y represent a 2D pixel coordinate of an image, XtoZ represents $$\tan\left(\frac{FovH}{2}\right) \times 2,$$

and FovH represents a horizontal angle of view of a camera. Further, YtoZ represents $$\tan\left(\frac{FovV}{2}\right) \times 2$$

and FovV represents a vertical angle of view of the camera.

The floor region detector 220 uses the 3D coordinate transmitted from the coordinate converter 210 for a predetermined initial time t to detect a floor plane from the entire image and calculate a plane reference distance value for all pixels of an image (S320). Here, a plane reference distance value d represents how far all the pixels (3D coordinate) is from a floor plane. The information on the floor plane detected by the floor region detector 220 is used to generate a background model and detect a region of interest and then extract 3D features that will be described below. The floor region detector 220 according to the exemplary embodiment of the present invention calculates the floor plane and a plane reference distance value using the following Equations 2 to 5.

First, the floor region detector 220 obtains three points $p_1$, $p_2$, and $p_3$ that passes the floor plane as the following Equation 2.

$$p_1 = \{x_1, y_1, z_1\},\ p_2 = \{x_2, y_2, z_2\},\ p_3 = \{x_3, y_3, z_3\} \quad \text{(Equation 2)}$$

In the Equation 2, p1 is defined as one point where Yrw has a minimum value on the 3D coordinate (real world coordinate). p2 searches 50 cm from the upper, lower, left, right, and surrounding of the place that is 80 cm equal to or more than z1 of the p1 and thus is defined as one point where a difference between the searched point and y1 of the p1 is equal to or less than a threshold value. Further, p3 searches 50 cm from the upper, lower, left, right, and surrounding of the place that is 80 cm equal to or more than z2 of the p2 and thus is defined as one point where a difference between the searched point and y2 of the p2 is equal to or less than a threshold value. Here, 80 cm and 50 cm are arbitrarily set depending on an image size and may be changed depending on the image size.

A plane Equation may be obtained like the following Equation 3 based on three points p1, p2, and p3 in the above Equation 2.

$$ax + by + cz = d \quad \text{(Equation 3)}$$

$$a = y_1(z_2 - z_3) + y_2(z_3 - z_1) + y_3(z_1 - z_2)$$

$$b = z_1(x_2 - x_3) + z_2(x_3 - x_1) + z_3(x_1 - x_2)$$

$$c = x_1(y_2 - y_3) + x_2(y_3 - y_1) + x_3(y_1 - y_2) \quad \text{(Equation 4)}$$

The plane Equation of the above Equation 3 represents the floor plane passing p1, p2, and p3. In the above Equation 3, a, b, and c represent coefficients of the plane Equation, which may be obtained by the following Equation 4. Further, in the above Equation 3, d is the plane reference distance value d and may have a value of 0 with respect to three points p1, p2, and p3 of the floor region. The plane reference distance value d may be obtained like the following Equation 5.

$$d=a*(\text{realworld}X-\text{ptPoint}X)+b*(\text{realworld}Y-\text{ptPoint}Y)+c*(\text{realword}Z-\text{ptPoint}Z) \quad \text{(Equation 5)}$$

In the above Equation 5, realworldX, realworldY, and realworldZ represent the real world coordinate (i.e. 3D coordinate) and ptPointX, ptPointY, and ptPointZ represent any one point (for example, p1, p2, and p3) of the floor plane. Therefore, if the above Equation 5 is applied to all the pixels of the floor plane, the plane reference distance value d for the floor plane may be 0. Further, if the plane reference distance value d obtained by the above Equation 5 is equal to or less than the predetermined threshold value (for example, 0), it may be considered as the floor region (plane).

Figure 4:
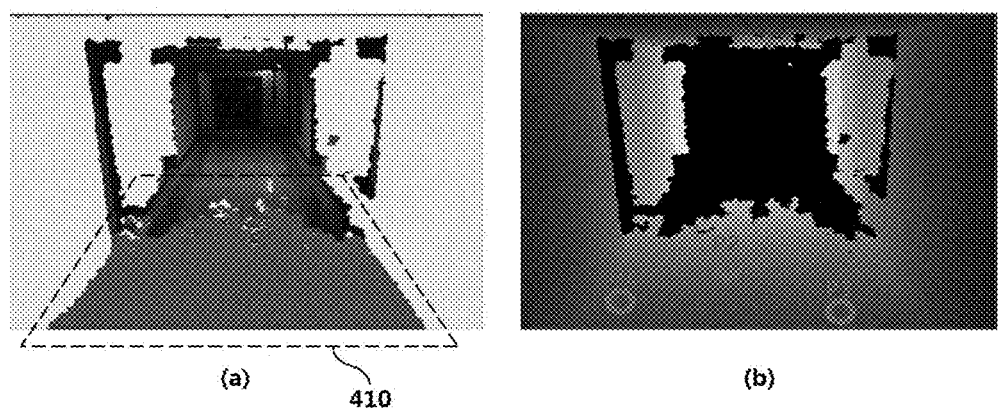
FIG. 4 is a diagram illustrating a floor detection result detected by a floor region detector 220 according to an exemplary embodiment of the present invention.

FIG. 4 is a diagram illustrating a floor detection result detected by a floor region detector 220 according to an exemplary embodiment of the present invention. (A) of FIG. 4 illustrates the floor detection result and (b) of FIG. 4 illustrates three points p1, p2, and p3 defining the floor plane. In FIG. 4A, reference numeral 410 represents the floor region at the real image. In FIG. 4A, reference numeral 410 that is the floor region (plane) is the plane reference distance value calculated by the above Equation 5 and has a value that is equal to or less than the predetermined threshold value.

Next, the background model generator 230 according to the exemplary embodiment of the present invention accumulates the plane reference distance values of each pixel calculated by the floor region detector 220 for a predetermined initial time t to calculate the average value and generate the average value as the initial background model (S330). Here, the user may set the predetermined initial time t as a predetermined time after the initial driving of the 3D camera 100.

Figure 5:
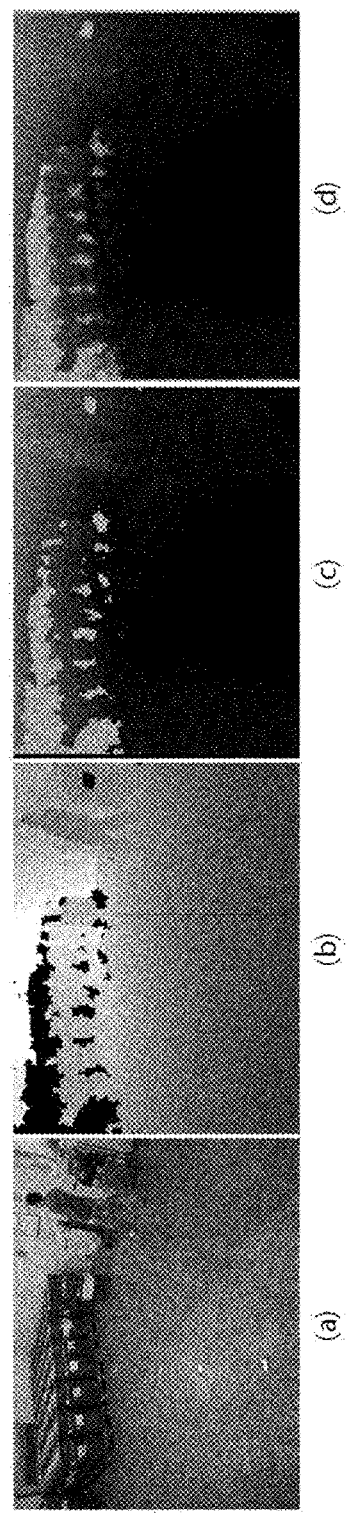
FIG. 5 is diagram illustrating an initial background model generated by a background model generator 230 according to an exemplary embodiment of the present invention.

FIG. 5 is diagram illustrating an initial background model generated by a background model generator 230 according to an exemplary embodiment of the present invention. (A) of FIG. 5 represents a color image and (b) of FIG. 5 represents a depth image obtained by the 3D camera 100.

(C) of FIG. 5 illustrates an image representing the plane reference distance value calculated by the floor region detector 220 according to the exemplary embodiment of the present invention. The plane reference distance value has a value approaching 0 toward the floor plane. Therefore, if the above Equation 5 is applied to the depth image as illustrated in (b) of FIG. 5 to calculate the plane reference distance value, as illustrated in (c) of FIG. 5, the plane reference distance value has a dark gray level (low value) toward the floor region. The background model generator 230 accumulates and averages the plane reference distance values generated as illustrated in (c) of FIG. 5 for the predetermined initial time t to generate the initial background model as illustrated in (d) of FIG. 5.

When the background model is generated using the plane reference distance value as described in the exemplary embodiment of the present invention, the background model may more easily detect an object approaching the floor surface than a Z value (depth value)-based background model. The Z value may be distorted depending on an installation height and an inclined angle of the camera but if the real world coordinate is reconfigured based on the floor plane (i.e., based on the plane reference distance value) as described in the exemplary embodiment of the present invention, the accuracy of the detection may be more increased.

The background determiner 240 divides the background and the foreground of the image incoming after the initial time t based on the initial background model generated in step S330 and updates the background region to the background model in real time (S340 and S330). Here, the background means regions, which does not move, such as a floor and a wall surface and the foreground means a region in which objects (person/object, or the like) move.

The background determiner 240 obtains the difference between the initial background model generated in step S330 and the plane reference distance value of the current image and determines the image as the foreground if the difference exceeds the threshold value and determines the image as the background if the difference is equal to or less than the threshold value. Further, the background determiner 240 updates the region determined as the background in the initial background model in real time. Here, the threshold value may have different values depending on the plane reference distance value d and the distance value Z obtained by the 3D camera. That is, the region that approaches the floor plane and is at a close distance may be set to have a lower threshold value and the region that is far away from the bottom plane and is at a long distance may be set to have a higher threshold value. According to the exemplary embodiment of the present invention, the region determined as the foreground is excluded but only the background region is updated to the background, in the step S340 of determining the background, and therefore even when a person/object stays at one location without moving after intrusion, the person/object is not absorbed into the background. When the background model is not determined and is not updated, if a person/object passes while the background model is generated, the person/object is absorbed into the background and thus the undetectable region may occur. According to the exemplary embodiment of the present invention, it is possible to prevent the undetectable region from occurring.

As described above, the region of interest detector 250 obtains the difference between the background model updated in real time and the current plane reference distance value to finally detect the region of interest and performs distance-based labeling on the region of interest (S350).

The region of interest detector 250 detects at least one of the following three conditions as the region of interest. First, the region of interest detector 250 may set the region in which the difference between the background model and the plane reference distance value of the current image is equal to or more than the threshold value as the region of interest. Next, the region of interest detector 250 may set, as the region of interest, the region in which the background model includes the lost depth value (depth value may be lost due to a long distance or an infrared absorption material) and therefore the plane reference distance value is 0 but the plane reference distance value of the current image is not 0. Further, the region of interest detector 250 may set the region of interest even when the plane reference distance value is 0 but the plane reference distance value of the background mode is not 0 since the object having the lost depth value emerges in the current image.

Figure 6:
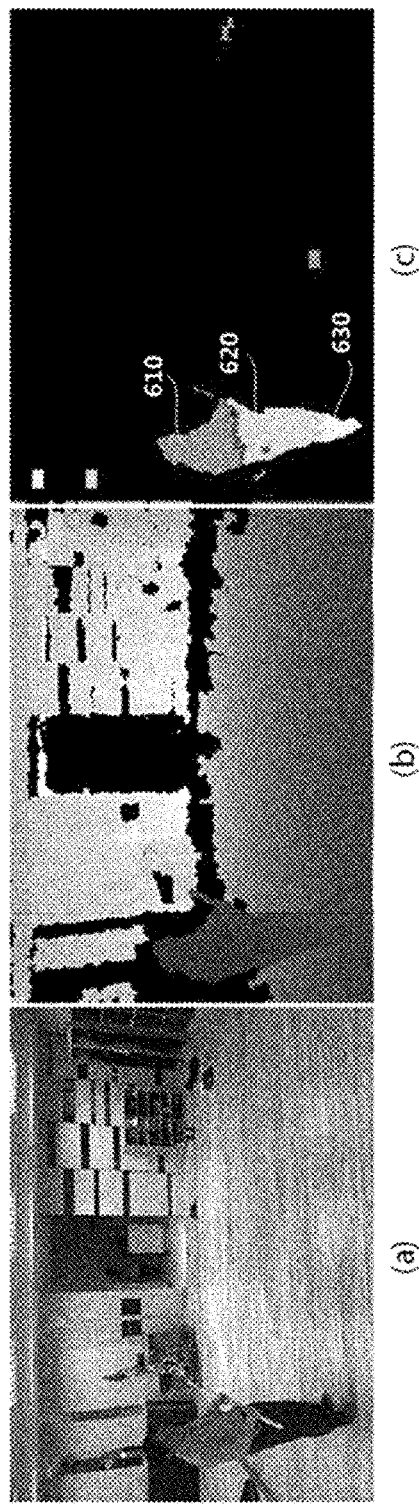
FIG. 6 is diagram illustrating a region of interest detection result generated by a region of interest detector 250 according to an exemplary embodiment of the present invention.

FIG. 6 is diagram illustrating the region of interest detection result generated by the region of interest detector 250 according to the exemplary embodiment of the present invention.

(A) of FIG. 6 represents a color image and (b) of FIG. 6 represents a depth image obtained by the 3D camera 100. Further, (c) of FIG. 6 is a diagram illustrating the region of interest detected by the region of interest detector 250 according to the exemplary embodiment of the present invention. In (c) of FIG. 6, reference numeral 610 represents the region in which the difference between the initial background model and the current plane reference distance value is equal to or more than the threshold value and reference numeral 620 represents the region in which the difference between the updated background model and the current plane reference distance value is equal to or more than the threshold value. Further, reference numeral 630 represents the region in which the plane reference distance value of the background model is 0 but the plane reference distance value of the current image is not 0.

Meanwhile, the region of interest detector 250 applies the distance-based labeling to the detected region of interest to remove noise and finally leave only the region of interest (S350). Here, the labeling means that the pixel value of the image is searched and thus adjacent pixel values are determined as the same object and the same label is allocated. According to the exemplary embodiment of the present invention, if the distance difference is within the threshold value distance, by using the pixel value of the region of interest and the 3D real world coordinate values Xrw, Yrw, and Zrw of each pixel, an object is determined as one object and thus the same label is allocated and if the distance difference is equal to or more than the threshold value, an object is determined as other objects and thus other labels are allocated.

Figure 7:
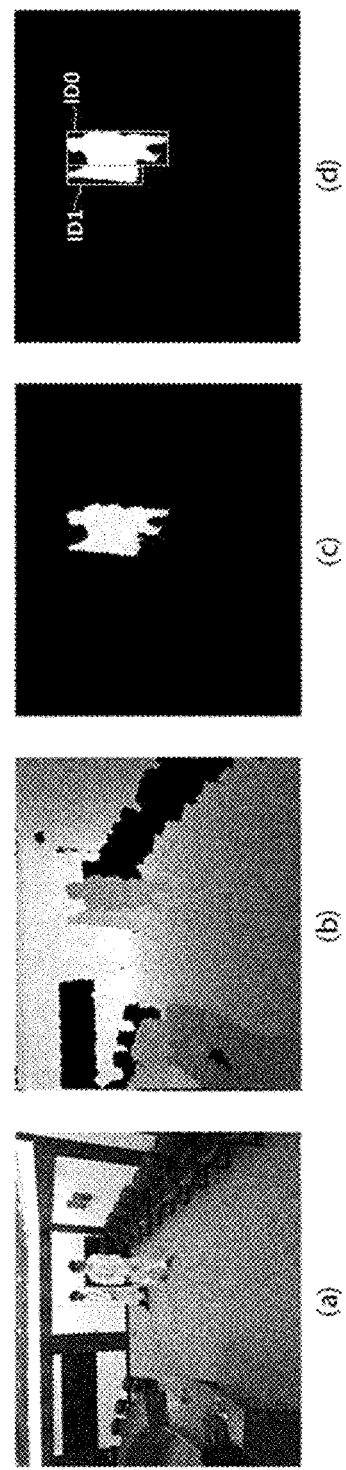
FIG. 7 is diagram illustrating the region of interest detection result generated by the region of interest detector 250 according to the exemplary embodiment of the present invention.

FIG. 7 is diagram illustrating the region of interest detection result generated by the region of interest detector 250 according to the exemplary embodiment of the present invention.

(A) of FIG. 7 represents the color image and (b) of FIG. 7 represents the depth image obtained by the 3D camera 100. Further, (c) of FIG. 6 represents the region of interest detected by the region of interest detector 250 and (d) of FIG. 6 is a diagram illustrating the region of interest labeled by the region of interest detector 250 and then finally detected. As illustrated in (c) of FIG. 6, when the region of interest is detected, if the labeling is performed using the 3D image information (i.e., depth information as illustrated in (b) of FIG. 6), a label is recognized as being different if the distance difference is equal to or more than the threshold value even when pixels are adjacent to each other. That is, as illustrated in (d) of FIG. 6, ID0 and ID1 are differently labeled since the distance difference is equal to or more than the threshold value. When the labeling is performed based on the 2D image, in (c) of FIG. 7, the an object is labeled as the same person, but when the labeling is performed using the 3D image distance information as described in the exemplary embodiment of the present invention, an object is labeled as other persons even when a number of persons are close to each other at a predetermined distance and thus the separation and detection can be performed.

The region of interest tracker 260 tracks the region of interest in real time using the central point information of the labeled region of interest (S360). That is, the region of interest tracker 260 calculates a Euclidean distance of a central point (CoM3d(x,y,z)) of the detected region of interest in a previous frame and a central point (CoM3d(x,y,z)) of the detected region of interest in a current frame and determines an object as the same object when the calculated value is within the threshold value and allocates the ID of the previous frame to the current frame.

The region of interest calculator 270 calculates 3D features such as a speed and a size of the region of interest to determine whether there are abnormal behaviors of the region of interest tracked by the region of interest tracker 260 (S370).

Figure 8:
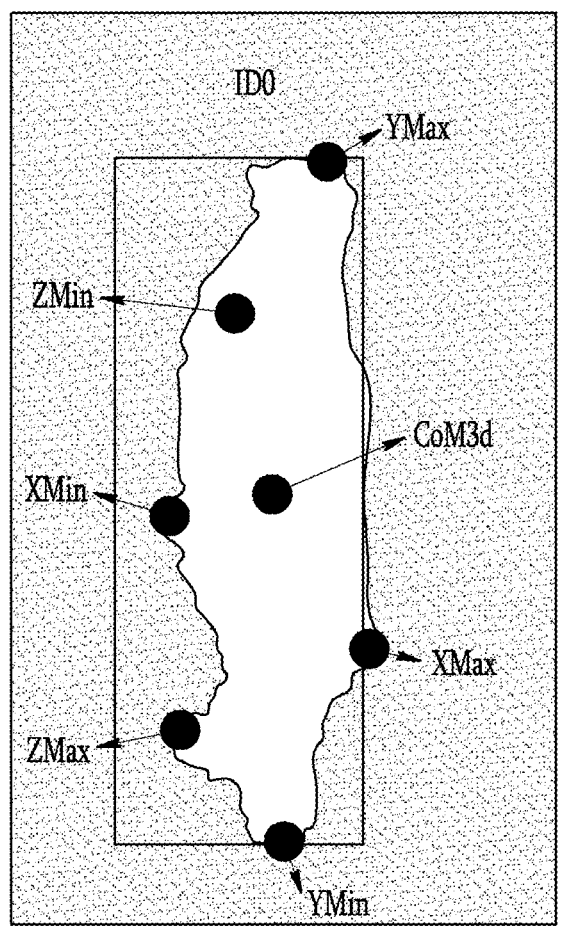
FIG. 8 is a diagram illustrating locations of minimum/maximum pixels of upper, lower, left, right, and depth (distance) with respect to a region of interest ID0.

First, the region of interest calculator 270 detects the 3D real world coordinate for the maximum and minimum locations of the upper, lower, left, right, and Zrw of the region of interest. FIG. 8 is a diagram illustrating locations of minimum/maximum pixels of upper, lower, left, right, and depth (distance) with respect to a region of interest ID0. In FIG. 8, XMin represents a minimum value pixel location of an X-axis coordinate and XMax represents a maximum value pixel location of the X-axis coordinate. YMlin and YMax each represent minimum and maximum value pixel locations of a Y-axis coordinate and ZMin and ZMax each represent minimum and maximum value pixel locations of a Z-axis coordinate. Further, CoM3d represents the pixel locations for the central point of the region of interest.

Next, the region of interest calculator 270 uses the 3D real world coordinates (Xrw, Yrw, and Zrw) to extract the 3D features such as a height, a width, a thickness, a moving speed, or the like of the object as shown in the following Table 1.

TABLE 1

| | |
|---|---|
| Height | $H = \begin{cases} (vNormal \cdot x \times (CoM3d \cdot x - ptPoint \cdot x)) + \\ (vNormal \cdot y \times (YMax \cdot y - ptPoint \cdot y)) + \\ (vNormal \cdot z \times (CoM3d \cdot z - ptPoint \cdot z)) \end{cases}$ |
| | * vNormal, x, y, z: normal of floor |
| | * pyPoint, x, y, z: one point of floor |
| Width | $W = XMax_x - XMin_x$ |
| Thickness | $D = Z\_Max_z - Z\_Min_z$ |
| Moving speed | $Speed = \sqrt{Speed_x^2 + Speed_z^2}$ |
| | * $Speed_x: |CoM3d_{x(L)} - CoM3d_{x(L-1)}| * (0.001 * FPS)$ |
| | * $Speed_z: |CoM3d_{z(t)} - CoM3d_{z(t-1)}| * (0.001 * FPS)$ |
| | $* CoM3d_{(x,y,z)}: \dfrac{Sum3d_{(x,y,z)}}{Area}$ |
| | * Sum3d(x, y, z): accumulated sum of real world coordinates $X_{rw}, Y_{rw}, Z_{ry}$ of labeling region |
| | * Area: the number of pixels of labeling region |

The abnormal behavior determiner 280 according to the exemplary embodiment of the present invention uses the 3D features extracted by the region of interest calculator 270 to determine abnormal behaviors of objects such as intrusion, wandering, crowding, falling, running behaviors of an object (S380). The exemplary embodiment of the present invention may mix the term 'object' and the term 'region of interest'.

The abnormal behavior determiner 280 sets a predetermined intrusion sensing area and then may determine that an object is intrusion and generate an alarm, when the object having a height, a width, and a thickness equal to or more than the threshold value appears within the sensing area.

The abnormal behavior determiner 280 may determine that an object wanders when the object having a height, a width, and a thickness equal to or more than the threshold value appears within the sensing area and at the same time moves at a moving speed equal to or more than a predetermined value for a predetermined time and generate an alarm.

The abnormal behavior determiner 280 sets the area in which the crowding is sensed and then calculates a Euclidean distance of the Z axis (Zrw) of the objects (i.e., a plurality of labels) emerging in the crowding sensing area and may determine that an object is the crowding and generate an alarm when an object (label) having the calculated Euclidean distance within the threshold value is equal to or more than the predetermined number.

The abnormal behavior determiner 280 determines that an object is a standing person by determining the height, width, and thickness of the object to be equal to or more than the threshold value and may finally determine that an object falls and generate an alarm, when the current height is lower than the initial height by the threshold value or more, the width/thickness is higher than the height, the height difference between the floor plane and the central point of the object (label) is equal to or less than the threshold value, and the lowered height is maintained for a predetermined time or more. The abnormal behavior determiner 280 according to the exemplary embodiment of the present invention may measure the height in consideration of the height difference between the floor plane and the central point of the object and therefore may stably estimate the height even when the object is partially covered.

The abnormal behavior determiner 280 may use the moving speed to determine whether the object is running. The abnormal behavior determiner 280 may determine that an object is a standing object when the height, the width, and the thickness are equal to or more than the threshold value, calculate the difference between the detection image of the current frame and the detection image of the previous frame to obtain the number of moving pixels, determine that the number of moving pixels are equal to or more than the threshold value, and determine that the object moves at a predetermined speed or more. When this conditions is satisfied, the abnormal behavior determiner 280 may determine that an object is running and generate an alarm Here, the abnormal behavior determiner 280 may reduce the incorrect reporting rate about the running determination caused by the track failure due to the conditions on the number of moving pixels.

According to the exemplary embodiment of the present invention, the abnormal behavior of the object is determined using the 3D features, thereby reducing the incorrect reporting due to the illumination or the change in the surrounding environment and increasing the abnormal behavior detection rate.

When the exemplary embodiment of the present invention is installed in medical facilities or a house, the exemplary embodiment of the present invention may automatically detect the behavior of sudden falling of an aged person and a patient and quickly cope therewith. Further, when the exemplary embodiment of the present invention is installed in a factory handling a dangerous article, the exemplary embodiment of the present invention may detect the behavior of falling or running due to a fire or a leakage of poisonous substances and cope therewith.

Further, when the exemplary embodiment of the present invention is installed in a public place, or the like that a number of people use simultaneously, the exemplary embodiment of the present invention may figure out the sudden falling or crowding situations, the running, the crowding, or the like and may quickly take a measure thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for surveilling, by a surveilling device, an object using an image input through a 3D camera, comprising:
converting the image into a real world coordinate that is a spatial coordinate;
detecting a floor plane and calculating a plane reference distance value representing a distance far away from the floor plane, using the real world coordinate;
generating a background model, which is a background portion of the image, on basis of the plane reference distance value for a predetermined time; and
comparing a first plane reference distance value, which is the plane reference distance value calculated in the calculating of the image input after the predetermined time, with the background model to detect a region of interest,
wherein the detecting of the floor plane and the calculating the plane reference distance value comprises:
setting three points $p_1$, $p_2$, $p_3$ located on the floor plane represented by Equation 2 using one point where a Y-axis value is a minimum value on the real world coordinate:
wherein Equation 2 is expressed as $p_1=\{x_1,y_1,z_1\}$, $p_2=\{x_2,y_2,z_2\}$, $p_3=\{x_3,y_3,z_3\}$;
wherein $\{x_1,y_1,z_1\}$, $\{x_2,y_2,z_2\}$, $\{x_3,y_3,z_3\}$ are real world coordinates; and
calculating a plane equation represented by Equation 3 using the three points $p_1$, $p_2$, $p_3$:
wherein Equation 3 is expressed as $ax+by+cz=d$;
wherein a, b, and c are coefficients which are obtained by Equation 4, and d is the plane reference distance value which is obtained by Equation 5:
wherein Equation 4 is expressed as $a=y_1(z_2-z_3)+y_2(z_3-z_1)+y_3(z_1-z_2)$, $b=z_1(x_2-x_3)+z_2(x_3-x_1)+z_3(x_1-x_2)$, $c=x_1(y_2-y_3)+x_2(y_3-y_1)+x_3(y_1-y_2)$; and
wherein Equation 5 is expressed as $d=a*(realworldX-ptPointX)+b*(realworldY-ptPointY)+c*(realworldZ-ptPointZ)$; and
wherein realworldX, realworldY, and realworldZ represent the real world coordinate and ptPointX, ptPointY, and ptPointZ represent any one point of the three points $p_1$, $p_2$, $p_3$ of the floor plane.

2. The method of claim 1, further comprising:
performing labeling on the region of interest using the real world coordinate of the region of interest.

3. The method of claim 2, further comprising:
tracking the labeled region of interest using central point information on the labeled region of interest.

4. The method of claim 1, further comprising:
determining whether there is an abnormal behavior of the object using the real world coordinate of the region of interest.

5. The method of claim 1, wherein:
the generating includes:
calculating an average value by accumulating the plane reference distance value for the predetermined time; and
setting the average value as the background model.

6. The method of claim 1, further comprising:
comparing the first plane reference distance value with the background model to determine a background portion and a foreground portion in the image; and
updating the background model using a region determined as the background portion.

7. The method of claim 6, wherein:
the detecting of the region of interest includes comparing the first plane reference distance value with the updated background model to detect the region of interest.

8. The method of claim 6, wherein:
the determining of the background portion and the foreground portion includes:
obtaining a difference value between the first plane reference distance value and the background model;
determining the foreground portion in the image if the difference value exceeds a predetermined threshold value; and
determining the background portion in the image if the difference value is equal to or less than the predetermined threshold value, and
the predetermined threshold value is differently set depending on a distance value from the floor plane.

9. The method of claim 4, wherein:
the determining whether there is an abnormal behavior of the object includes:
extracting a 3D feature including at least one of a height, a width, a thickness, and a moving speed of the object using the real world coordinate of the region of interest; and
determining whether there is an abnormal behavior of the object using the 3D feature.

10. The method of claim 9, wherein:
the abnormal behavior of the object is at least one behavior of intrusion, wandering, crowding, falling, and running of the object.

11. A surveilling device, comprising:
a coordinate converter converting a depth image input through a 3D camera into a real world coordinate that is a space coordinate;
a floor region detector detecting a floor plane and calculating a plane reference distance value representing a distance far away from the floor plane, using the real world coordinate;
a background model generator generating a background model, which is a background portion of a depth image, on basis of the plane reference distance value for a first time; and
a region of interest detector comparing a first plane reference distance value that is the plane reference distance value calculated by the floor region detector with the background model, for the depth image input after the first time to detect a region of interest,
wherein the detecting of the floor plane and the calculating the plane reference distance value comprises:
setting three points $p_1$, $p_2$, $p_3$ located on the floor plane represented by Equation 2 using one point where a Y-axis value is a minimum value on the real world coordinate:
wherein Equation 2 is expressed as $p_1=\{x_1,y_1,z_1\}$, $p_2=\{x_2,y_2,z_2\}$, $p_3=\{x_3,y_3,z_3\}$;
wherein $\{x_1,y_1,z_1\}$, $\{x_2,y_2,z_2\}$, $\{x_3,y_3,z_3\}$ are real world coordinates; and
calculating a plane equation represented by Equation 3 using the three points $p_1$, $p_2$, $p_3$:
wherein Equation 3 is expressed as $ax+by+cz=d$;
wherein a, b, and c are coefficients which are obtained by Equation 4, and d is the plane reference distance value which is obtained by Equation 5:
wherein Equation 4 is expressed as $a=y_1(z_2-z_3)+y_2(z_3-z_1)+y_3(z_1-z_2)$, $b=z_1(x_2-x_3)+z_2(x_3-x_1)+z_3(x_1-x_2)$, $c=x_1(y_2-y_3)+x_2(y_3-y_1)+x_3(y_1-y_2)$; and
wherein Equation 5 is expressed as d=a*(realworldX−ptPointX)+b*(realworldY−ptPointY)+c*(realworldZ−ptPointZ); and
wherein realworldX, realworldY, and realworldZ represent the real world coordinate and ptPointX, ptPointY, and ptPointZ represent any one point of the three points $p_1$, $p_2$, $p_3$ of the floor plane.

12. The surveilling device of claim 11, wherein:
the region of interest detector performs a label for the region of interest using the real world coordinate of the region of interest, and
the surveilling device further comprises a region of interest tracker tracking the labeled region of interest using central point information on the labeled region of interest.

13. The surveilling device of claim 11, further comprising:
a region of interest calculator extracting a 3D feature for an object using the real world coordinate of the region of interest; and
an abnormal behavior determiner determining whether there is an abnormal behavior of the object using the 3D feature.

14. The surveilling device of claim 11, wherein:
the background model generator accumulates the plane reference distance value for the first time to calculate an average value and sets the average value as the background model.

15. The surveilling device of claim 11, further comprising:
a background determiner comparing the first plane reference distance value with the background model to determine the background portion in the image and using the background portion to update the background model.

16. A surveilling system, comprising:
a 3D camera installed in a region to be monitored and acquiring an image of the region; and
a surveilling device converting a depth image acquired from the 3D camera into a real world coordinate that is a space coordinate, using the real world coordinate to detect a floor plane of the depth image, calculating a plane reference distance value representing a distance far away from the floor plane, generating a background model, which is a background portion of the depth image, on basis of the plane reference distance value calculated for a predetermined time, and calculating a first value that is a value obtained by calculating the plane reference distance value for the depth image incoming after the predetermined time and compares the first value with the background model to detect a region of interest,
wherein the detecting of the floor plane and the calculating the plane reference distance value comprises:
setting three points $p_1$, $P_2$, $p_3$ located on the floor plane represented by Equation 2 using one point where a Y-axis value is a minimum value on the real world coordinate:
wherein Equation 2 is expressed as $p_1=\{x_1,y_1,z_1\}$, $p_2=\{x_2,y_2,z_2\}$, $p_3=\{x_3,y_3,z_3\}$;

wherein $\{x_1,y_1,z_1\}$, $\{x_2,y_2,z_2\}$, $\{x_3,y_3,z_3\}$ are real world coordinates; and calculating a plane equation represented by Equation 3 using the three points $p_1$, $p_2$, $p_3$:

wherein Equation 3 is expressed as $ax+by+cz=d$;

wherein a, b, and c are coefficients which are obtained by Equation 4, and d is the plane reference distance value which is obtained by Equation 5:

wherein Equation 4 is expressed as $a=y_1(z_2-z_3)+y_2(z_3-z_1)+y_3(z_1-z_2)$, $b=z_1(x_2-x_3)+z_2(x_3-x_1)+z_3(x_1-x_2)$, $c=x_1(y_2-y_3)+x_2(y_3-y_1)+x_3(y_1-y_2)$; and wherein Equation 5 is expressed as $d=a*(realworldX-ptPointX)+b*(realworldY-ptPointY)+c*(realworldZ-ptPointZ)$; and wherein realworldX, realworldY, and realworldZ represent the real world coordinate and ptPointX, ptPointY, and ptPointZ represent any one point of the three points $p_1$, $p_2$, $p_3$ of the floor plane.

17. The surveilling system of claim 16, wherein:

the surveilling device uses the real world coordinate of the region of interest to perform a label on the region of interest, uses the real world coordinate of the region of interest to extract a 3D feature for an object, and uses the 3D feature to determine an abnormal behavior of the object.

\* \* \* \* \*